United States Patent [19]
Harrold et al.

[11] 3,775,676
[45] Nov. 27, 1973

[54] METHODS FOR LOCATING PARTIAL DISCHARGES IN ELECTRICAL APPARATUS

[75] Inventors: Ronald T. Harrold, Murrysville; Charles A. Long, Sharpsville, both of Pa.

[73] Assignee: Westinghouse Electric Corporation, Pittsburgh, Pa.

[22] Filed: July 21, 1972

[21] Appl. No.: 273,920

[52] U.S. Cl. .................... 324/52, 324/54, 324/55
[51] Int. Cl. .................... G01r 31/06, G01r 31/08
[58] Field of Search .................... 324/51, 52, 54, 55

[56] References Cited
OTHER PUBLICATIONS
Harrold, R. T., Voltage Vector Analysis for Corona Location in Transformers, IEEE Transactions Sept./Oct. 1971, Vol. PAS–90 No. 5 pages 2339–2348.

*Primary Examiner*—Gerard R. Strecker
*Attorney*—A. T. Stratton et al.

[57] ABSTRACT

A three-phase voltage is induced into a first three-phase winding, and by virtue of connections made thereto, a plurality of potential distribution patterns are developed across the first winding with respect to ground, between individual phase windings, and between the first winding and a second winding. Second and third single-phase voltages are induced into the first winding and additional potential distribution patterns are developed. The potential distribution patterns developed by the first, second and third voltages and connections are compared at the corona inception or extinction level to determine the potential common to all three potential distribution patterns produced by the three voltages. The corona source is located at the site within the windings corresponding to this common potential. Observing the relationship of the corona signal to the voltage waveforms provides additional information regarding the corona location, and also about the nature of the corona source.

10 Claims, 22 Drawing Figures

FIG.3
TEST A

FIG.4
TEST B

FIG.5
TEST C

METHODS FOR LOCATING PARTIAL DISCHARGES IN ELECTRICAL APPARATUS

BACKGROUND OF THE INVENTION

1. Field of the Invention

This invention relates, in general, to partial discharge or corona locating methods and, more specifically, to corona locating methods using voltage and phase distribution techniques.

2. Description of the Prior Art

Various methods and techniques have been used and have been described for locating the source of partial discharges in electrical apparatus, such as power transformers. Several effective methods are disclosed in U.S. Pat. No. 3,684,951, filed Dec. 9, 1970, Ser. No. 96,343, which is assigned to the same assignee as is this invention.

Presently known methods of corona locating are helpful and are now being used more often with the construction of higher voltage transformers which are required to have very low corona values. Partial discharges may occur at many different locations in a power transformer. It is important to locate partial discharges so that the type of source can be determined and proper repairs of alterations may be made.

Partial discharges or corona within an insulation system like that of a power transformer are in effect a localized dielectric breakdown of a small element of the system, which is overstressed by the applied voltage. The local breakdown is often a consequence of the existence of a low electric strength region, such as a gas cavity, or a local very high stress point, such as a metal sliver inclusion. The voltage may be the voltage between a transformer winding and the magnetic core or transformer casing. Partial discharges produced by this voltage must be located between the winding and the core or casing. However, corona discharges sometimes occur at locations which are between the high-voltage windings and the low-voltage windings or between phases in multiple-phase transformers. Most conventional voltage and phase sensitive corona locating methods are not capable of distinguishing the particular region in which the corona is located or, in some methods, may always indicate that the partial discharge location is between winding and ground potential.

Therefore, it is desirable, and it is an object of this invention, to provide a novel method for locating the source of partial discharges in electrical apparatus which indicates the region of the source and the components of the apparatus which produce the voltage to excite the partial discharges.

Several useful methods are known which will determine approximate corona locations. However, these methods do not provide information about the nature of the partial discharge, that is, whether the corona exists in oil, air, or insulation voids, etc. Such information is useful in determining the exact location of the partial discharges after the electrical apparatus is disassembled.

Therefore, it is desirable, and it is another object of this invention, to provide a novel method for locating the source of corona discharges and for determining the nature of the corona discharge.

SUMMARY OF THE INVENTION

There are disclosed herein new and useful methods for locating the source of partial discharges in electrical apparatus. One method determines the axial distance along a winding and the radial region from the winding in which the corona source is located. A three-phase generator provides voltages on the windings being tested during the first test of the corona locating method. From the corona inception or extinction voltages observed, potential distribution patterns are determined for the potential difference between the phase windings and ground, between the high-voltage and the low-voltage phase windings, and between adjacent high-voltage phase windings. Second and third tests are performed using a single-phase generator and potential distribution patterns corresponding to the same potential differences are determined. The intersection of the potential distribution patterns from all three tests at a common point indicates an axial and a radial region of the corona source. A second method provides a first potential distribution pattern across the corona producing winding which is in phase with the potential at the corona source. A second potential distribution pattern is provided which is out of phase with the first potential distribution pattern. Observing the potential distribution patterns and detecting the phase difference in the corona pulse signals provides information about the location of the corona source. By noting the relationship of the corona pulses to the voltage waveforms, the nature of the corona source may be determined.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Throughout the following description, similar reference characters refer to similar elements in all figures of the drawings.

Figure 1:
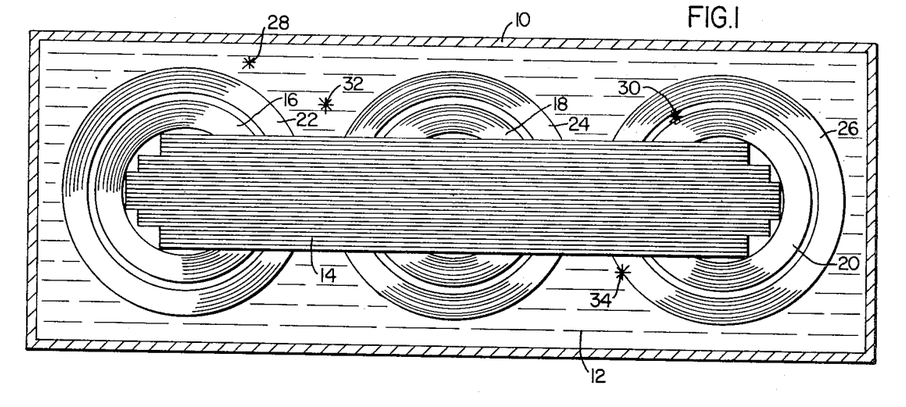
FIG. 1 is a top view of a three-phase transformer.

Referring now to the drawings, and FIG. 1 in particular, there is shown a top view of a core-form power transformer. The core and coil assembly is housed in the casing 10 which is filled with transformer oil 12. The three-phase laminated magnetic core 14 includes three legs each having a winding assembly disposed thereon. The winding assemblies consist of disc-type coils which are positioned along the axes of the core legs. The low-voltage windings 16, 18 and 20 are each disposed around separate core legs. The high-voltage windings 22, 24 and 26 are disposed around the low-voltage windings 16, 18 and 20, respectively.

FIG. 1 illustrates some of the physical locations where a corona discharge may occur. Corona location 28 is positioned between the high-voltage winding 22 and the transformer casing 10. Thus, a corona discharge at location 28 is produced by the voltage stress between the high-voltage winding 22 and ground. Corona location 30 is positioned between the high-voltage winding 26 and the low-voltage winding 20. Thus, a corona discharge at location 30 is produced by the voltage stress between the high-voltage winding 26 and the low-voltage winding 20. Corona location 32 is positioned between the high-voltage windings 22 and 24 and is produced by the voltage stress therebetween. Corona location 34 is adjacent to the high-voltage winding 26 and may be produced by voltage stress between the high-voltage windings 24 and 26 or between the high-voltage winding 26 and either the core 14 of the casing 10. Therefore, determining the transformer components which provide the corona producing voltage stresses helps determine the region of the corona location. By using an appropriate corona locating method to determine the axial position of the corona source, that is, the position along an axis perpendicular to FIG. 1, the corona location can be accurately pinpointed.

Figure 2:
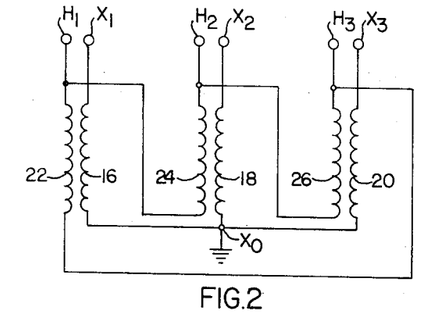
FIG. 2 is a schematic diagram of a three-phase transformer connection arrangement.

FIG. 2 is a schematic diagram of the winding connections of a transformer having a wye-connected low-voltage winding and a delta-connected high-voltage winding. FIG. 2 will be used in describing this invention as applied to wye-delta connected three-phase transformers. Other winding connection arrangements may be used within the contemplation of this invention. Terminals $H_1$, $H_2$ and $H_3$ are the phase terminals for the delta-connected high-voltage winding. Terminals $X_1$, $X_2$ and $X_3$ are the phase terminals for the wye-connected low-voltage winding. Terminal $X_0$ is the neutral terminal for the low-voltage winding. The phase and neutral terminals may be brought through the transformer casing 10 by appropriate bushing structures.

Figure 3:
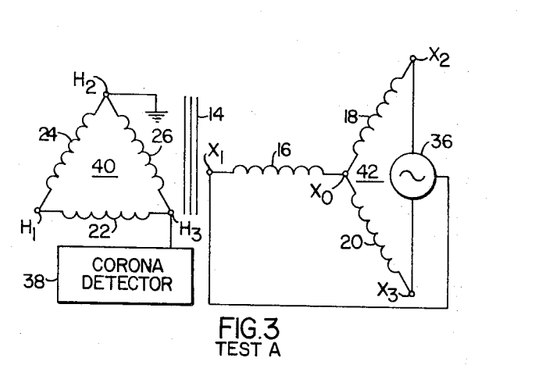
FIG. 3 is a schematic diagram illustrating the connections of a three-phase test according to this invention.
Figure 4:
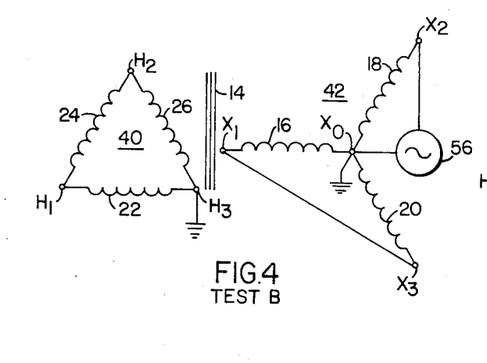
FIG. 4 is a schematic diagram illustrating the connections of one single phase test according to this invention.
Figure 5:
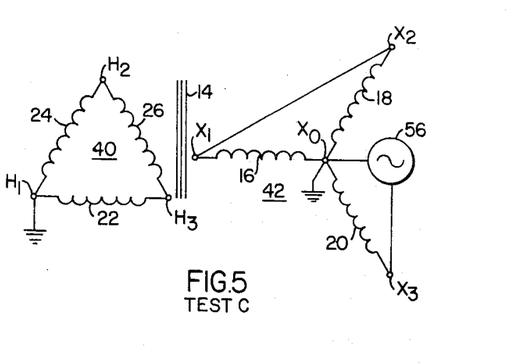
FIG. 5 is a schematic diagram illustrating the connections of another single-phase test according to this invention.

A specific embodiment of this invention uses the connection arrangements illustrated in FIGS. 3, 4 and 5. For the purpose of this description, it will be assumed that the turns ratio between the high-voltage and low-voltage phase windings is 6 to 1. Tests A, B and C, which correspond to FIGS. 3, 4 and 5, respectively, are performed to obtain the necessary information. Although the values indicated herein are typical, other circuit values obtained during the corona locating tests are within the contemplation of this invention.

For this illustration, it is desirable to locate the corona source in a three-phase wye-delta connected transformer. In test A, FIG. 3, the low-voltage phase windings 16, 18 and 20 are energized by the three-phase generator 36 and the phase terminal $H_2$ is grounded. A corona detecting device 38 is used to detect the inception and extinction of the corona discharge. Normally, the corona detecting device is connected to the winding terminal which provides the best corona signal. The corona detector 38 may be a device which detects the high frequency signal generated by the corona discharge. Acoustical corona detectors, as well as other types, may also be used.

The magnitude of the voltage provided by the generator 36 is varied until the condition of the corona discharge changes. The condition change may be either the inception of the corona discharge or the extinction of the corona discharge. Generally, the condition which provides the more consistent change will be used. In the example described herein, the inception condition will be used.

It is observed that corona discharges incept when the phase voltage on the high-voltage winding 40 is 121 kV. The inception voltage can be determined by measuring the voltage between two high-voltage phase terminals, such as terminals $H_1$ and $H_3$, by measuring the voltage on the generator 36 and multiplying the measured voltage by the appropriate constant, or by measuring the phase voltage on the low-voltage winding 42 and applying the appropriate factor.

Figure 7:
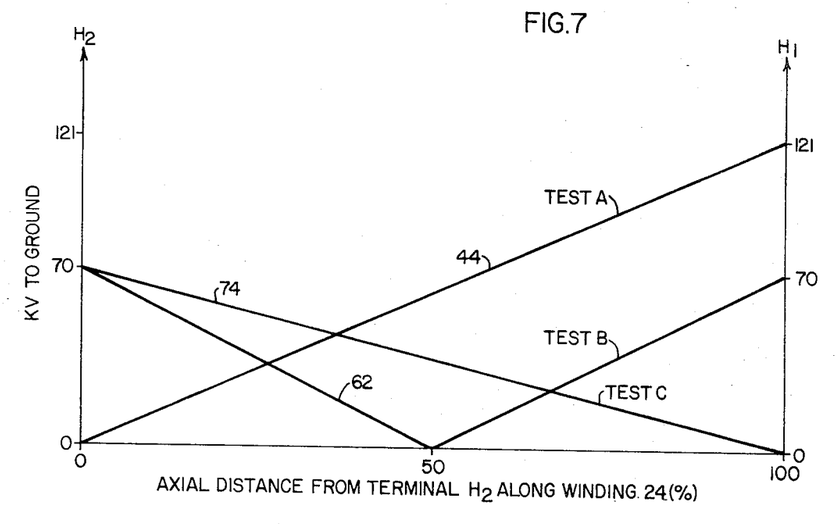
Figure 8:
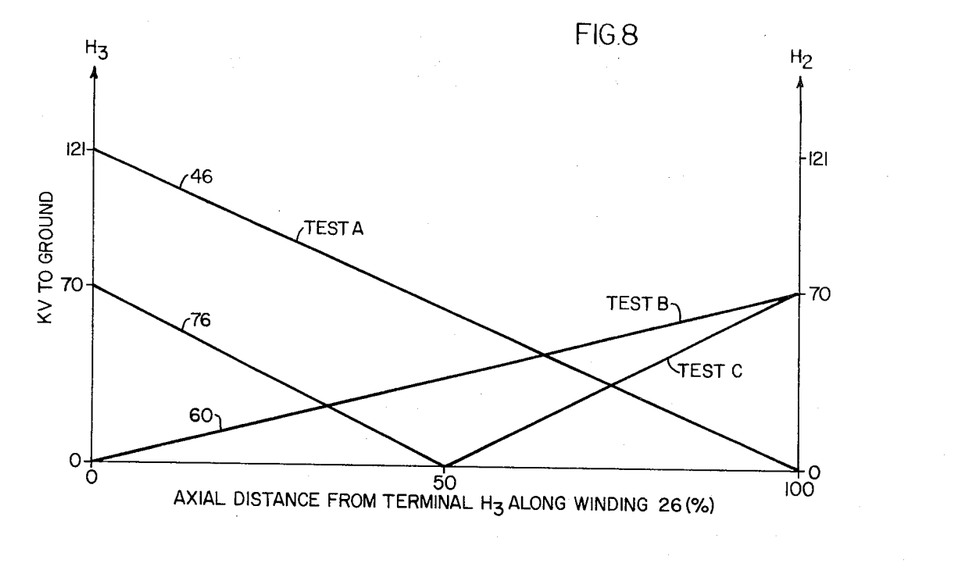

By knowing that the voltages on the high-voltage phase windings 22, 24 and 26 are 121 kV at corona inception, it is possible to determine eight different potential distribution patterns for the high-voltage winding 40. Since terminal $H_2$ is grounded, the voltage at terminal $H_1$ with respect to ground is 121 kV at corona inception. The potential distribution along the axial dimension of the phase winding 24 is linear. Therefore, the curve 44 of FIG. 7 graphically represents the voltage with respect to ground for the winding 24 at corona inception. Similarly, the voltage with respect to ground at terminal $H_3$ is 121 kV. Therefore, the curve 46 of FIG. 8 represents the axial potential distribution pattern between the phase winding 26 and ground.

Figure 6:
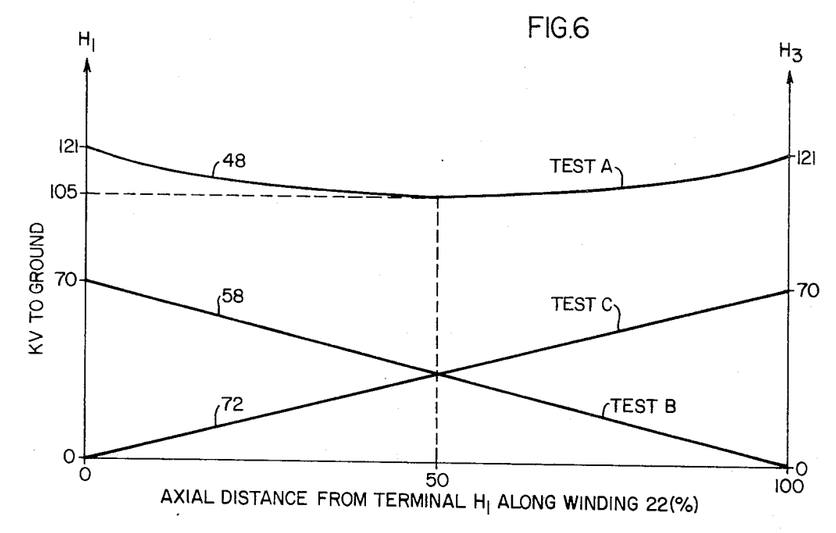
FIGS. 6, 7 and 8 are graphs of potential distribution patterns for potential differences bewteen the phase windings and ground.

The voltages on terminals $H_1$ and $H_3$ are each equal to 121 kV with respect to ground. The voltage along the phase winding 22 is reduced at its center due to the phase relationship between the phase windings 22, 24 and 26. The voltage at the center of the phase winding 22 with respect to ground is the vector sum of the voltage across the phase winding 24 or 26 and one-half of the voltage across the phase winding 22. With 121 kV across each phase winding, the voltage at the center of phase winding 22 is 105 kV. Thus, curve 48 of FIG. 6 represents the axial potential distribution pattern between the phase winding 22 and ground at corona inception.

Figure 9:
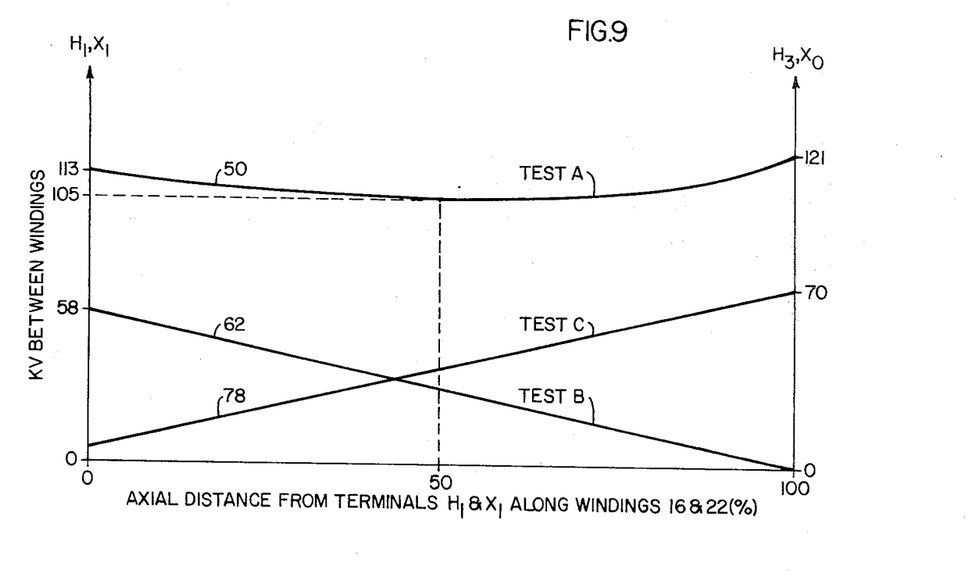
FIGS. 9, 10 and 11 are graphs of potential distribution patterns for potential differences between the high-voltage and the low-voltage phase windings.

Test A also provides data for determining the potential distribution pattern across high-voltage phase windings 22, 24 and 26 with respect to the low-voltage phase windings 16, 18 and 20, respectively. As shown in FIG. 2, the end of the high-voltage phase winding 22 which is connected to terminal $H_1$ is adjacent to the end of the low-voltage phase winding 16 which is connected to terminal $X_1$. The potential difference between the terminal ends of the phase windings 16 and 22 may be determined by applying vector analysis to the voltages across the phase windings 16 and 22. It is known that 121 kV exists across the high-voltage phase winding 22, that with the 6 to 1 winding ratio approximately 20 kV exists across the low-voltage phase winding 16, and that the phase displacement between the two voltages is 150°. With this information, it can be determined that the potential difference between the high-voltage phase winding 22 and the low-voltage phase winding 16 at the terminal ends is 113 kV. By similar analysis, it can be determined that the potential difference is 105 kV at the center of the phase windings 16 and 22. The lower end of the phase winding 16 is grounded, and the lower end of the phase winding 22 is electrically connected to terminal $H_3$, and since terminal $H_3$ is known to have a voltage to ground of 121 kV, the potential difference between the phase windings 16 and 22 is 121 kV. The curve 50 of FIG. 9 represents the axial potential distribution pattern between the phase windings 16 and 22.

Figure 10:
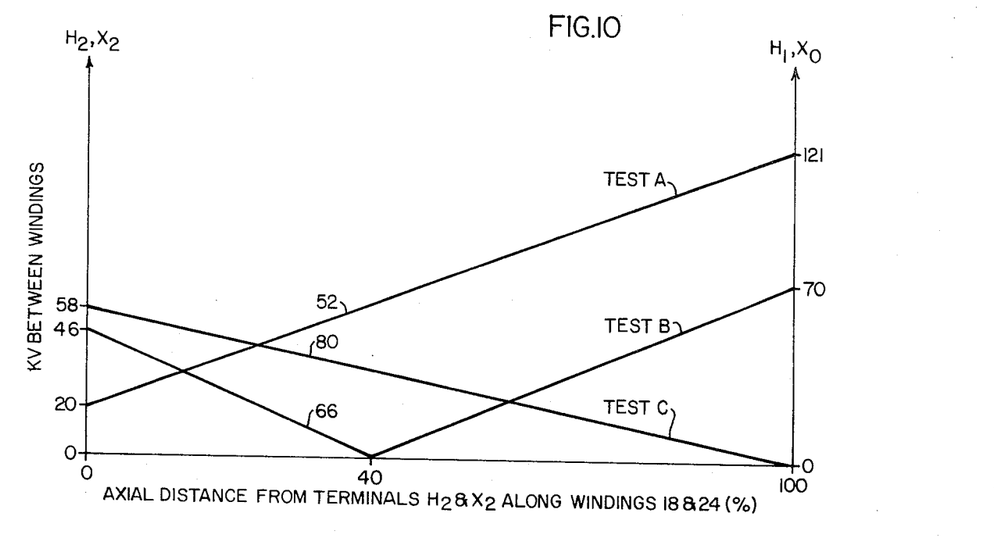

From the information of test A, the potential distribution pattern between phase windings 18 and 24 can be determined. Since the end of the low-voltage phase winding 18 is connected to ground, and since it has already been determined that the potential at terminal $H_1$ is 121 kV with respect to ground, the lower end of the phase winding 24 has a potential of 121 kV with respect to the lower end of the phase winding 18. Since terminal $H_2$ is grounded during test A, the potential difference between the upper ends of the phase windings 18 and 24 is 20 kV, which is the voltage applied to the phase winding 18. Curve 52 of FIG. 10 represents the axial potential distribution pattern between the phase windings 18 and 24.

Figure 11:
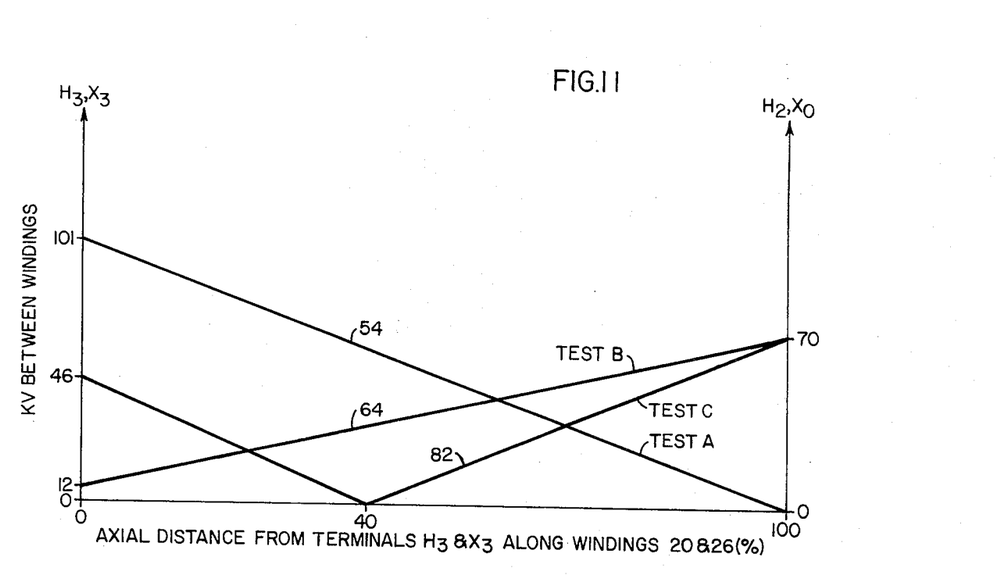

The data from test A is also used to determine the potential distribution pattern between the phase windings 20 and 26. The potential difference at the lower ends of the phase windings 20 and 26 is zero since both ends are grounded during test A. Since the phase windings 20 and 26 are 180° out of phase with each other, and since 121 kV exists across phase winding 26 and 20 kV exists across the phase winding 20, there is a potential difference of 101 kV between the upper ends of the phase windings 20 and 26. Curve 54 of FIG. 11 represents the axial potential distribution pattern between the phase windings 20 and 26.

To survey the existence of corona discharges at all the reasonable locations in the transformer, the potential difference between the adjacent high-voltage phase windings is determined. The axial potential distribution pattern between the high-voltage phase windings 24 and 26 is illustrated by the curve 88 of FIG. 12. Since 121 kV exists across each high-voltage phase winding, the potential difference between the high-voltage phase windings 24 and 26 is euqal to 121 kV at the phase winding ends. Due to the phase of the potential difference between the windings, the potential between the center of the phase windings 24 and 26 is one-half of the phase voltage, or 60.5 kV. The curve 90 of FIG. 13 is similarly determined for the axial potential distribution pattern between the high-voltage phase windings 22 and 24.

In test B, which is illustrated in FIG. 4, a single-phase generator 56 is connected to the terminals $X_0$ and $X_2$ and the terminals $X_1$ and $X_3$ are connected together to insure that the same voltage is developed across phase windings 16 and 20. The terminal $H_3$ is grounded to provide the proper potential distribution patterns. The voltage of the generator 56 is increased until the inception of a corona discharge. A corona discharge may be detected by conventional apparatus as herein described. From the potential differences developed across the terminals of the high-voltage winding 40, potential distribution patterns can be determined.

It is pointed out that three-phase techniques are not used in determining the potential distribution patterns for test B since the transformer is energized by a single-phase generator 56. The corona discharge incepts when 70 kV appears across the phase winding 22. Thus, the potential distribution pattern curve 58 of FIG. 6 represents the potential distribution pattern of the phase winding 22 with respect to ground. By similar reasoning, the curve 60 of FIG. 8 represents the potential distribution pattern of the phase winding 26 with respect to ground.

The voltage across the low-voltage phase windings 16 and 20 is one-half of the voltage across the phase winding 18. Therefore, the voltage across the high-voltage phase windings 22 and 26 is one-half of the voltage across the high-voltage phase winding 24, which is approximately 140 kV. The voltage of the phase winding 24 is 180° out of phase with the voltages across the phase windings 22 and 26. Thus, the potential difference with respect to ground across phase winding 24 is effectively zero at its midpoint. The curve 62 of FIG. 7 represents the potential distribution pattern of the phase winding 24 with respect to ground.

From the data of test B, a potential distribution pattern between the high-voltage and low-voltage phase windings can be determined. The voltage of the generator 56 is approximately 24 kV at the inception of the corona discharge. The voltage on the low-voltage phase winding 16 is approximately 12 kV since the generator voltage is two times the voltage across the induced low-voltage phase windings 16 and 20. Since the voltages on phase windings 16 and 22 are in phase, the potential difference between the upper ends of the phase windings 16 and 22 is 70 kV minus 12 kV or 58 kV. Curve 62 of FIG. 9 represents the axial potential distribution pattern between the phase windings 16 and 22.

Curve 64 of FIG. 11 represents the axial potential distribution pattern between the phase windings 20 and 26. The lower end of phase winding 20 is grounded and it is known that the potential difference bewteen terminal $H_2$ and ground is 70 kV, therefore, the potential difference between the lower ends of the phase windings 20 and 26 is 70 kV. At the upper ends, the terminal $H_3$ is grounded and the voltage at terminal $X_3$ is 12 kV with respect to ground. Thus, the potential difference between the upper ends of the phase windings 20 and 26 is 12 kV.

Curve 66 of FIG. 10 represents the axial potential distribution pattern between the phase windings 18 and 24. Potential difference across phase winding 18 is approximately 24 kV. Potential difference across phase winding 26 is approximately 70 kV. Terminals $X_0$ and $H_3$ are common reference points because both are grounded. The voltage between the upper ends of the phase windings 18 and 20 is 70 kV minus 24 kV or approximately 46 kV. At the lower ends, the potential difference between the phase windings 18 and 24 is 70 kV. The potential difference at intermediate axial positions between the phase windings 18 and 24 is shown by curve 66.

Figure 12:
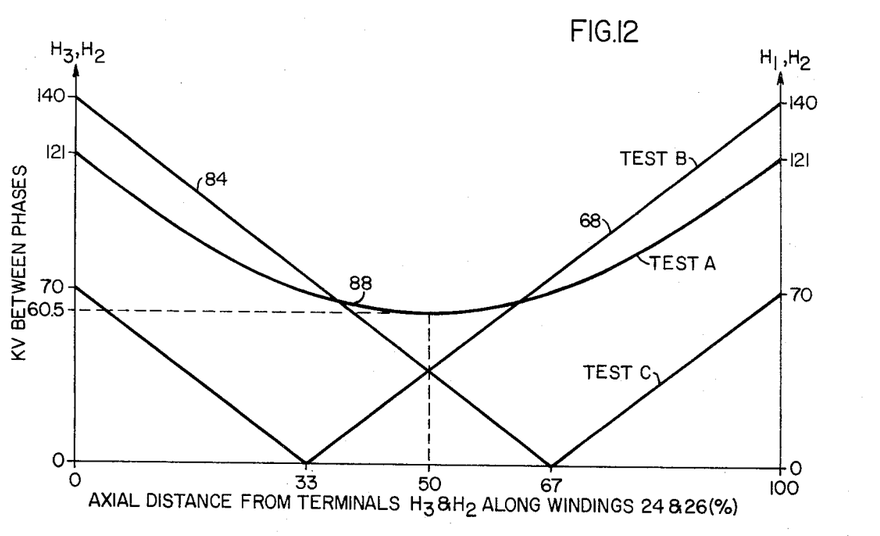
FIGS. 12 and 13 are graphs of potential distribution patterns for potential differences between adjacent high-voltage phase windings.
Figure 13:
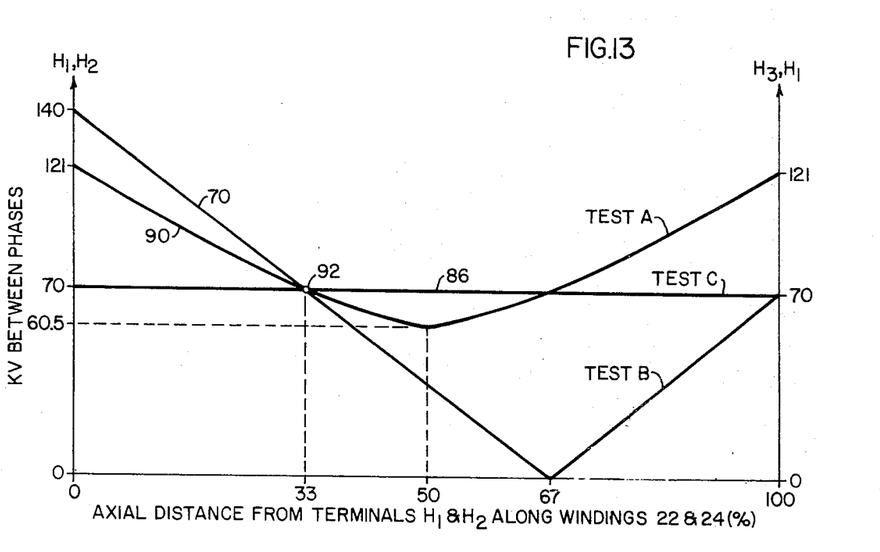

Curve 68 of FIG. 12 represents the axial potential distribution pattern between high-voltage phase windings 24 and 26. Since 70 kV exists across the phase winding 26, the potential between the upper ends of the phase windings 24 and 26 is 70 kV. Similarly, since 140 kV exists across the phase winding 24, the potential difference between the lower ends of the phase windings 24 and 26 is 140 kV. The potential at intermediate axial positions between the phase windings 24 and 26 is shown by curve 68.

Curve 70 of FIG. 13 represents the axial potential distribution pattern between the high-voltage phase windings 22 and 24. Determination of curve 70 is similar to that of curve 68. The potential distribution patterns illustrated by curves 72, 74, 76, 78, 80, 82, 84 and 86 of FIGS. 6, 7, 8, 9, 10, 11, 12 and 13, respectively, are provided by test C wherein the single-phase generator 56 is connected to the phase winding 20 and the terminals $X_1$ and $X_2$ are connected together. Determination of the curves is similar to the procedure concerning the curves of test B, however, the ground connection is made at terminal $H_1$.

It can be seen that the potential distribution pattern curves provided by the information obtained from tests A, B and C all intersect a common point at only one location, that is, point 92 in FIG. 13 on curves 70, 86 and 90. From this, it can be concluded that the corona discharge source is axially located 33 percent of the distance along the phase windings 22 and 24 from terminals $H_1$ and $H_2$ and in the region on or between the phase windings 22 and 24.

The number of arrangements of generator, ground, short circuit and winding connections available to provide different phase distribution patterns is large. The arrangements shown for tests A, B and C are illustrative only. Some other useful single phase arrangements are shown in FIGS. 14, 15, 16 and 17.

Figure 14:
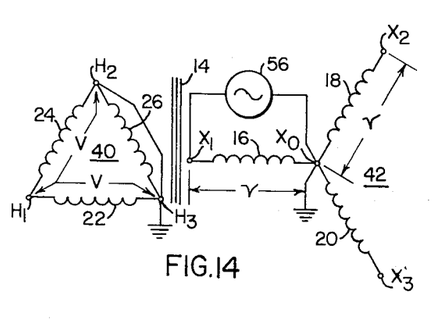
FIGS. 14, 15, 16 and 17 are schematic diagrams illustrating other connections which may be used for the single-phase test.

In FIG. 14, the generator 56 is connected to the phase winding 16 of the wye-connected low-voltage winding 42 and the phase winding 26 of the delta-connected high-voltage winding 40 is shorted. The relative control terminal voltage differences are illustrated in FIG. 14. Since the terminals of phase winding 26 are connected together or shorted to each other, and since phase winding 20 is on the same magnetic leg as phase winding 26, the reluctance of the leg is high and the induced magnetic flux flows through the leg on which the phase windings 18 and 24 are positioned. Thus, negligible short circuit current flows and negligible voltage develops on the low-voltage phase winding 20.

Figure 15:
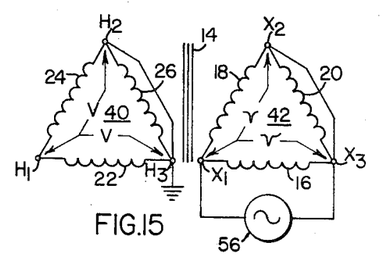
Figure 16:
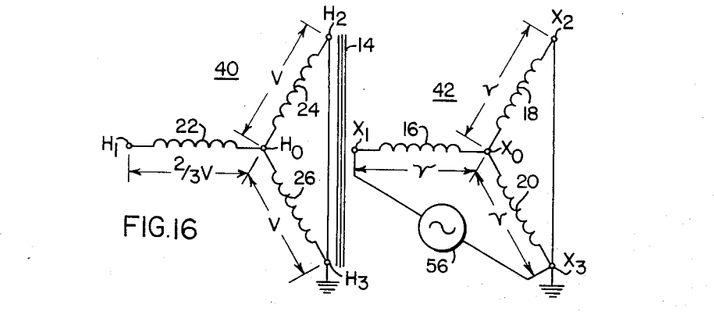
Figure 17:
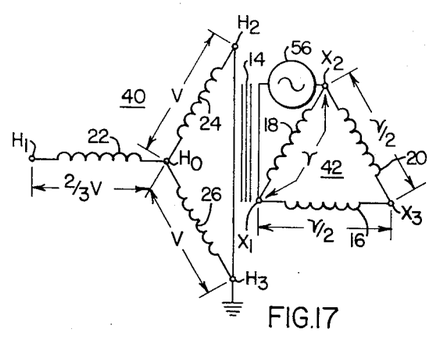

Similar flux and voltage relationships occur in the arrangements of FIGS. 15, 16 and 17. In FIG. 15, the generator 56 is applied to the delta-connected winding 42 and the delta-connected winding 40 is shorted across the phase winding 26. In FIGS. 16 and 17, the wye-connected high-voltage windings 40 have the open phase winding 22 induced with two-thirds of the voltage induced into the other high-voltage phase windings.

The comparison of the phase distribution patterns derived from the data of tests A, B and C can be accomplished graphically according to the example described. To add to the versatility of this invention, a computer may be used to make the comparisons. The computer may be programmed for the different potential distribution patterns and only the inception voltages would have to be entered to get a location response from the computer.

Figure 18:
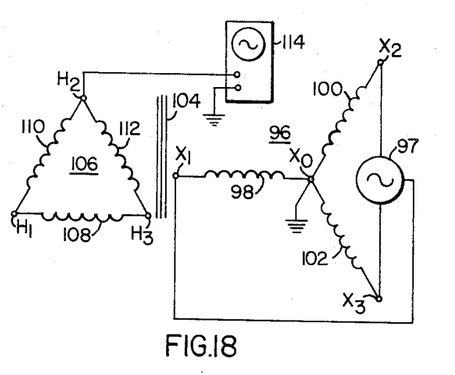
FIG. 18 is a schematic diagram of a method of locating corona according to another embodiment of this invention.

It is helpful in locating the source of corona discharges to determine the nature of the corona source, that is, whether it is in oil, air, insulation voids, etc. FIG. 18 illustrates an arrangement for detecting corona discharges in a phase winding and determining the nature of the corona source.

The three-phase generator 97 is connected to the wye-connected winding 96 which includes the phase windings 98, 100 and 102. The magnetic core 104 couples the winding 96 to the delta-connected winding 106 which includes the phase windings 108, 110 and 112. A detecting device, such as the oscilloscope 114, is connected to the winding 106 to indicate the presence of a corona discharge and also to display a fraction of the transformer sine wave voltage. Normally, initial measurements would be made to determine which terminal of the winding 106 provides the strongest corona signal when the generator 97 has sufficient magnitude to provide corona discharges within the transformer.

Figure 19:
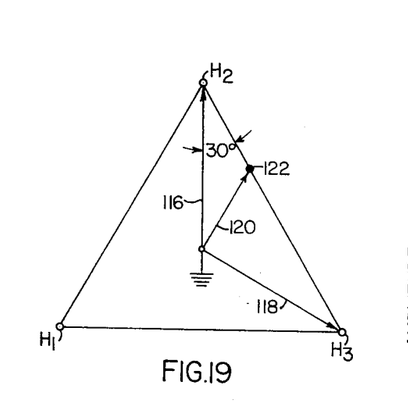
FIG. 19 is a diagram illustrating voltage phase relationships existing during the test shown in FIG. 18.

With the oscilloscope 114 connected to terminal $H_2$, the vector 116 of FIG. 19 represents the relative phase and magnitude of the induced voltage observed by the oscilloscope 114. The vector 118 represents the induced voltage which would be observed by the oscilloscope 114 when connected to terminal $H_3$. The vector 120 represents the induced voltage which would be observed if the oscilloscope 114 could be connected to the winding at point 122 which is the location of the corona source. Since the corona discharge signal pulses appear on the oscilloscope 114 substantially instantaneously, the corona is observed on the voltage waveform.

Figure 20:
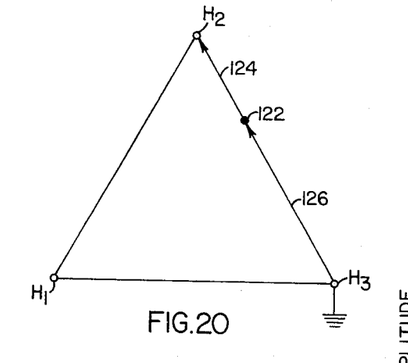
FIG. 20 is a diagram illustrating voltage phase relationships existing during the test shown in FIG. 18 with terminal $H_3$ grounded.

FIG. 20 is a vector diagram illustrating the voltage vectors existing with respect to ground when terminal $H_3$ is grounded. Vector 124 represents the phase voltage between terminals $H_2$ and $H_3$ and vector 126 represents the voltage between terminal $H_3$ and the corona location point 122. It can be seen that vectors 124 and 126 are in phase with each other.

Figure 21:
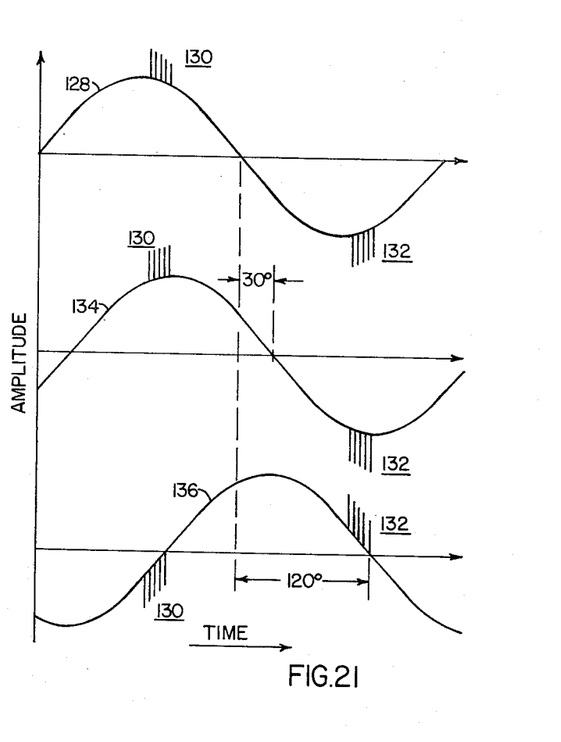
FIG. 21 is a graph illustrating the voltage waveforms and corona pulses observed during the tests of this embodiment.

Locating corona by this method involves observing the waveform of the voltage without a winding terminal being grounded. Curve 128 of FIG. 21 represents the voltage at terminal $H_2$ without terminal $H_3$ grounded. The corona pulses 130 and 132 are superimposed on the voltage curve 128. Next, terminal $H_3$ is grounded and the voltage represented by curve 134 is observed. It is known that the phase difference in the observed voltages is 30° regardless of the location of the corona source.

The true relation of the phase voltage and the corona pulses is indicated by the curve 134. The apparent relation of the phase voltage to the corona pulses is indicated by the curve 128. By comparing the curves 128 and 134, it can be determined that the corona pulses must be shifted 30° to be aligned with each other. In effect, the information provided by the curves 128 and 134 indicates the electrical distance across the winding which the corona pulses must be moved to provide a superimposed curve at the phase terminal which is identical to the actual superimposed curve at the corona source location. As a check, the curve 136 is illustrated in FIG. 21. Curve 136 is obtained from measurements at terminal $H_3$. It is noted that curves 128 and 136 are 120° out of phase with each other. By comparing curves 134 and 136, and the corona pulses on each curve, it can be determined that the corona pulses 130 and 132 on curve 136 must be shifted 90° to correspond to the corona pulses 130 and 132 on curve 134.

By applying the proper trigonometric relations to FIG. 19, the physical position along the winding of the corona source can be calculated. If the electrical distance from one terminal is 30° as in the example described, the distance in percentage of the total winding length to the corona source is calculated from the formula:

% winding = (sin 30°)/( $\sqrt{3}$ sin [150°−30°]) × 100%

Figure 22:
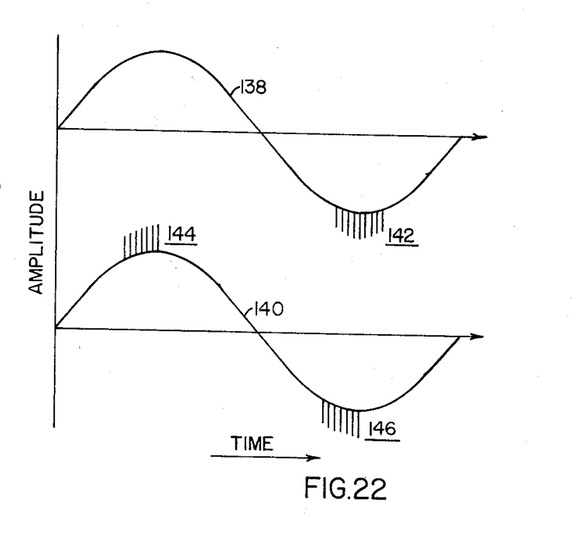
FIG. 22 is a graph illustrating the relationship of corona pulses and voltages for particular corona sources.

With the corona source located, the nature of the corona source may be determined. Curves 138 and 140 of FIG. 22 represent typical corona pulse positions with respect to the voltage waveform. The position of the corona pulse 142 on the negative half cycle is indicative of a corona discharge occurring at a sharp point in oil. The position of the corona pulses 144 and 146 just before the peak voltage is reached is indicative of a corona discharge occurring at an insulation void. Thus, this method provides information about the nature of the corona source as well as its location.

Since numerous changes may be made in the above described methods and different embodiments of the invention may be made without departing from the spirit thereof, it is intended that all of the matter contained in the foregoing description or shown in the accompanying drawings, shall be interpreted as illustrative rather than limiting.

We claim as our invention:

1. A method of locating the source of corona discharges in a transformer having first and second windings, said method comprising the steps of:

energizing said first and second windings with a first voltage to provide a first potential distribution pattern between said first winding and ground and a second potential distribution pattern between said first and second windings, detecting corona discharges and noting the magnitude of the first voltage which produces a change in the condition of the corona discharges, energizing said first and second windings with a second voltage to provide a third potential distribution pattern between said first winding and ground and a fourth potential distribution pattern between said first and second windings, detecting corona discharges and noting the magnitude of the second voltage which produces a change in the condition of the corona discharges, energizing said first and second windings with a third voltage to provide a fifth potential distribution pattern between said first winding and ground and a sixth potential distribution pattern between said first and second windings, detecting corona discharges and noting the magnitude of the third voltage which produces a change in the condition of the corona discharges, comparing the first, third and fifth potential distribution patterns at the first, third and fifth noted magnitudes, respectively, comparing the second, fourth and sixth potential distribution patterns at the second, fourth and sixth noted magnitudes, respectively, determining which potential distribution pattern comparison has a winding potential common to the three potential distribution patterns of that comparison to indicate the radial region in which the corona discharges are located, and determining from the location of the common winding potential the axial location of the corona discharges.

2. The method of locating the source of corona discharges of claim 1 wherein the changes in the condition of the corona discharges produced by the first, second and third voltages are the extinction of the corona discharges as the voltages are decreased.

3. The method of locating the source of corona discharges of claim 1 wherein the changes in the condition of the corona discharges produced by the first, second and third voltages are the inception of the corona discharges as the voltages are increased.

4. The method of locating the source of corona discharges of claim 1 wherein the first and second windings are multiple-phase windings having a plurality of phase windings, the first voltage being a multiple-phase voltage applied to the second winding, the second and third voltages being single-phase voltages applied to a phase winding of the second winding.

5. A method of locating the source of corona discharges in a transformer having first and second three-phase windings, said first winding comprising delta-connected phase windings connected between first, second and third phase terminals, said second winding comprising wye-connected phase windings, said method comprising the steps of:

inducing voltages into the phase windings of said first winding by applying a first three-phase voltage to the second winding, grounding one of said phase terminals to provide a first potential distribution pattern between a phase winding of said first winding and ground, a second potential distribution between the phase windings of said first winding and said second winding, and a third potential distribution pattern between adjacent phase windings of said first winding, detecting corona discharges and noting the magnitude of the first voltage which produces a change in the condition of the corona discharges, inducing voltages into the phase windings of said first winding by applying a second single-phase voltage to the second winding, grounding one of said phase terminals to provide a fourth potential distribution pattern between a phase winding of said first winding and ground, a fifth potential distribution pattern between the phases of said first winding and said second winding, and a sixth potential distribution pattern between adjacent phase windings of said first winding, detecting corona discharges and noting the magnitude of the second voltage which produces a change in the condition of the corona discharges, inducing voltages into the phase windings of said first winding by applying a third single-phase voltage to the second winding, grounding one of said phase terminals to provide a seventh potential distribution pattern between a phase winding of said first winding and ground, an eighth potential distribution pattern between the phases of said first winding and said second winding, and a ninth potential distribution pattern between adjacent phase windings of said first winding, detecting corona discharges and noting the magnitude of the third voltage which produces a change in the condition of the corona discharges, comparing the first, fourth and seventh potential distribution patterns at the first, second and third noted magnitudes, respectively, comparing the second, fifth and eighth potential distribution patterns at the first, second and third noted magnitudes, respectively, comparing the third, sixth and ninth potential distribution patterns at the first, second and third noted magnitudes, respectively, determining which potential distribution pattern comparison has a winding potential common to the three potential distribution patterns of that comparison to indicate the radial region in which the corona discharges are located, and determining from the location of the common winding potential the axial location of the corona discharges.

6. The method of locating the source of corona discharges of claim 5 including the steps of:

grounding the first phase terminal when the first voltage is applied, grounding the second phase terminal when the second voltage is applied, and grounding the third phase terminal when the third voltage is applied.

7. The method of locating the source of corona discharges of claim 5 wherein the second three-phase winding includes fourth, fifth, sixth and seventh phase terminals, and wherein the method includes the steps of:

connecting the second voltage between the fourth and sixth phase terminals, and shorting together the fifth and seventh phase terminals.

8. The method of locating the source of corona discharges of claim 7 including the steps of:

connecting the third voltage between the fourth and seventh phase terminals, and shorting together the fifth and sixth phase terminals.

9. A method of locating the source of corona discharges in a multiple-phase delta-connected transformer winding, said method comprising the steps of:

energizing the winding phases with a multiple-phase voltage, detecting corona pulses in said phase winding, determining a first phase relationship between the detected corona pulses and the phase winding voltage at a first phase winding terminal with respect to ground, grounding one terminal of said phase winding and determining a second phase relationship between the detected corona pulses and the phase winding voltage at said first phase winding terminal with respect to ground, determining the electrical distance the corona pulses of the first phase relationship must be shifted to provide the second phase relationship, and converting the determined electrical distance to physical dimensions corresponding to the axial dimension of the phase winding.

10. The method of locating the source of corona discharges of claim 9 including the step of comparing the second phase relationship with typical corona discharge phase relationships to determine the nature of the corona source.

* * * * *